United States Patent
Dhlamini

(10) Patent No.: US 11,146,053 B2
(45) Date of Patent: Oct. 12, 2021

(54) BUSHING FOR A TRANSFORMER

(71) Applicant: Power HV Inc., Reston (CA)

(72) Inventor: Sizwe Magiya Dhlamini, Reston (CA)

(73) Assignee: Power HV Inc., Manitoba (CA)

(*) Notice: Subject to any disclaimer, the term of this patent is extended or adjusted under 35 U.S.C. 154(b) by 0 days.

(21) Appl. No.: 15/010,790

(22) Filed: Jan. 29, 2016

(65) Prior Publication Data

US 2017/0222420 A1    Aug. 3, 2017

(51) Int. Cl.
*H02G 15/013* (2006.01)
*H01F 27/04* (2006.01)

(52) U.S. Cl.
CPC .......... *H02G 15/013* (2013.01); *H01F 27/04* (2013.01)

(58) Field of Classification Search
CPC .... H02G 15/013; H02G 15/064; H01F 27/04; H01R 3/00; H01R 13/53
See application file for complete search history.

(56) References Cited

U.S. PATENT DOCUMENTS

| | | | |
|---|---|---|---|
| 1,582,353 A | 4/1926 | Smith et al. | |
| 1,715,646 A | 6/1929 | Elmen | |
| 1,910,309 A | 5/1933 | Smith et al. | |
| 1,989,563 A | 1/1935 | Smith et al. | |
| 2,600,979 A * | 6/1952 | Dormont | H01F 27/04 174/12 R |
| 3,462,545 A * | 8/1969 | Grimmer | H01B 17/28 174/143 |
| 3,475,682 A | 10/1969 | Peek et al. | |

(Continued)

FOREIGN PATENT DOCUMENTS

| | | |
|---|---|---|
| CN | 204314342 U | 5/2015 |
| GB | 2013000 A | 8/1978 |
| JP | S62-211840 A | 9/1987 |

OTHER PUBLICATIONS

Arnold et al., "Permalloy, A New Magnetic Material of Very High Permeability", Bell System Tech. J., 1923; Nokia Bell Labs, 2(3): 101-111.

(Continued)

*Primary Examiner* — William H. Mayo, III
*Assistant Examiner* — Krystal Robinson
(74) *Attorney, Agent, or Firm* — Bereskin & Parr LLP/S.E.N.C.R.L., s.r.l.; Tony Orsi

(57) ABSTRACT

A bushing for a transformer is provided, the bushing comprising an elongate enclosure body to accommodate a conductor extending along a longitudinal axis, the conductor having a first terminal end a second terminal end, the ends extending from opposite sides of the enclosure body; and a mounting flange fitted to the enclosure body to enable the bushing to be mounted to an enclosure of the transformer. The enclosure body comprises two electrically insulating layers partially surrounding the conductor, a first layer of the insulating layers being substantially provided by a first polymeric material, and a second layer of the insulating layers being substantially provided by a second polymeric material, the layers being arranged about the conductor in such a manner that the bushing is substantially cavity-free. In an embodiment, the first layer defines an inner core, with the second layer providing an outer cover which at least partially covers the inner core.

15 Claims, 4 Drawing Sheets

(56) References Cited

U.S. PATENT DOCUMENTS

| | | | | |
|---|---|---|---|---|
| 4,214,119 | A * | 7/1980 | Keen, Jr. | H01B 17/30 174/18 |
| 4,387,266 | A * | 6/1983 | Matthaus | H01B 17/28 174/31 R |
| 4,500,745 | A * | 2/1985 | Miggins | H01B 17/34 174/143 |
| 5,198,622 | A * | 3/1993 | Hammarsten | H01F 27/04 174/143 |
| 5,652,521 | A * | 7/1997 | Meyer | G01R 15/16 324/541 |
| 5,933,012 | A * | 8/1999 | Bengtsson | G01R 15/181 324/524 |
| 6,282,848 | B1 | 9/2001 | Schlapfer | |
| 6,313,640 | B1 | 11/2001 | Nasrallah et al. | |
| 6,452,109 | B1 * | 9/2002 | Koch | H01B 17/26 174/142 |
| 6,774,639 | B1 | 8/2004 | Unsworth | |
| 8,013,607 | B2 | 9/2011 | DeMeester et al. | |
| 8,455,763 | B2 * | 6/2013 | Dais | H01B 17/28 174/152 R |
| 9,046,901 | B2 | 6/2015 | Hamberger et al. | |
| 10,438,723 | B2 * | 10/2019 | Titze | H01B 7/423 |
| 2009/0288878 | A1 * | 11/2009 | Rocks | H01B 17/265 174/665 |
| 2013/0233617 | A1 * | 9/2013 | Engels | H01R 3/00 174/74 A |
| 2015/0325341 | A1 * | 11/2015 | Hedlund | H01B 19/04 174/143 |
| 2016/0055965 | A1 * | 2/2016 | Miyahara | H01F 27/04 336/105 |
| 2020/0258661 | A1 * | 8/2020 | Engels | H02G 15/06 |

OTHER PUBLICATIONS

Glickman et al., "High Permeability Permalloy for MEMS", Solid State Sensors and Actuators Workshop, Hilton Head, SC, 2010 (4 pages).

Mclyman, Chapter 2—Magnetic Materials and Their Characteristics, in "Transformer and Inductor Design Handbook", 3rd ed., Kg Megnetics, Inc.; Idyllwild, CA, 2004 (pp. 49-101).

* cited by examiner

BUSHING FOR A TRANSFORMER

FIELD OF THE INVENTION

The invention relates to electrical bushings. More particularly, the invention relates to an oil-free bushing, also referred to as a dry bushing, for a transformer. The invention also relates to a transformer including an oil-free bushing.

BACKGROUND OF THE INVENTION

When used with reference to electrical devices or systems, the term "bushing" refers to an insulated device that allows an electrical conductor to pass safely through a conducting barrier, which is usually earthed. An example of such a conducting barrier is an enclosure, or wall, of a transformer.

In a power transformer, bushings serve to connect the windings of the transformer to a supply line external to the transformer, while insulating an incoming or outgoing conductor from the enclosure of the transformer.

A bushing includes a conductor made of a conductive material, which connects the windings of the transformer to a supply line, and insulation partially surrounding the conductor. Bushings employing various types of insulating materials have been developed, including porcelain, paper, resin and fibreglass.

Existing bushings have a number of drawbacks, including:
1. Oil-impregnated porcelain bushings tend to suffer from fractures, fires and/or explosions, potentially leading to injuries or fatalities. Similarly, oil-impregnated paper bushings may catch fire or develop oil leaks, and also prone to moisture ingress. These bushings are also dependent on the availability of oil.
2. A drawback of resin bushings is that the insulation in such bushings may be relatively brittle and lack adequate resistance to shock, thus increasing the risk of failure.
3. Further, bushings having insulation provided by fibreglass may be prone to delaminate due to high electric stress, moisture ingress and/or as a result of pollution. Delamination is also a concern in resin bonded paper designs.

The present invention aims to provide a transformer bushing that addresses the above shortcomings, at least to some extent. It is also an aim of the invention to enable the condition of the bushing to be readily and accurately determined. In this regard, it is known that one way of determining the condition of a bushing is to calculate the bushing condition assessment variable of power factor (PF) (or the related dielectric loss factor (DF)) value, for quantifying the condition of bushing insulation systems. The PF and DF values are related by the equations below:

$$DF = \frac{PF}{\sqrt{1-(PF)^2}}$$

$$PF = \frac{DF}{\sqrt{1+(DF)^2}}$$

Electrical bushings can be represented by an equivalent circuit diagram for the insulation circuit (FIG. 3) and related insulation phasor diagram (FIG. 4), which show the components of the total current and the applied voltage across the insulation material of the bushing.

Electrical bushings can be represented by an equivalent circuit diagram for the insulation circuit (FIG. 3) and related insulation phasor diagram (FIG. 4), which show the components of the total current and the applied voltage across the insulation material of the bushing.

Cosine of the power angle ($\theta$) is called the power factor. The complement of $\theta$ is called the loss angle and is denoted by $\delta$ in FIG. 4. If $\theta$ decreases, more resistive current will flow through the insulation and thus the power factor will increase.

The power factor, PF, is the ratio of the real power in watts, W, dissipated in a material, to the complex power which is a product of the effective sinusoidal voltage, V, and current, I, in volt-amperes (VA). Power factor may be expressed as the cosine of the phase angle ($\theta$) (or the sine of the loss angle ($\delta$)).

The equation below thus provides the power factor:

$$PF = \cos\theta = \sin\delta = \frac{I_r}{I} = \frac{V \cdot I_r}{V \cdot I} = \frac{P}{S} = \frac{G}{\sqrt{G^2 + (\omega \cdot C)^2}}$$

where
I=total current (mA);
Ic=capacitive current (mA);
Ir=leakage current (mA);
V=voltage applied across the insulation (V);
S is the complex power=Voltage (V)×Current (I) (Volt-Amperes (VA))
P is the real power, as follows:
P=V×I Watts (W)
P=V×I×cosine($\theta$) Watts (W)
C=equivalent parallel capacitance (F); and
G=equivalent ac conductance.

The dielectric loss factor, (DF), is the ratio of the resistive current (Ir) to the capacitive current (Ic) which is equal to the tangent of its loss angle ($\delta$) or the cotangent of its phase angle ($\theta$) (see FIGS. 3 and 4). DF is also called loss tangent, tan $\delta$, tan D or tan delta, and is calculated using the following equation:

$$DF = \tan(\delta) = \frac{I_r}{I_c} = \cot(\theta) = \frac{X_c}{R} = \frac{G}{\omega C} = \frac{1}{\omega C \cdot R}$$

where
C=equivalent parallel capacitance (F), with $$C = \sum_{i=1}^{n} C_i;$$

R=equivalent ac parallel resistance (Ohm);
G=equivalent ac conductance;
Xc=parallel reactance; and
$\omega=2\pi f$ (assuming a sinusoidal wave shape).

The reciprocal of the dissipation factor DF is the quality factor, Q, sometimes called the storage factor. When the dissipation factor DF is less than 0.1, the power factor PF differs from the dissipation factor by less than 0.5%.

One way of determining the condition of a bushing is to measure leakage current. The underlying principle is that all insulating dielectric materials have some power losses due to leakage current, which will vary depending on:

1. the type of insulation;
2. the amount of dielectric material;
3. the temperature of the dielectric;
4. the voltage and frequency applied across the insulation;
5. the frequency of the applied voltage;
6. the humidity during operation;
7. the extent of water immersion of the bushing;
8. the extent of weathering;
9. the age of the bushing in operation;
10. the quality of manufacturing process and
11. conditioning while in operation, as described in ASTM D150 (2011), Standard Test Methods for AC Loss Characteristics and Permittivity (Dielectric Constant) of Solid Electrical Insulation.

As losses increase due to any or all the above causes, the power factor PF will also increase, reflecting deterioration in insulation ability. This deterioration is caused by changes in the dielectric material due to:

1. aging of material;
2. inclusion of contaminants during production;
3. absorption of moisture while in service;
4. breakdown of bubble inclusions under voltage stress; and
5. other factors as explained further below.

With reference to FIG. 5, the sum of the leakage currents for three bushings at one side of a transformer allows the bushing's dielectric loss factor DF and capacitance (C1) to be determined, where the C in the above DF equation is the total capacitance corresponding to the sum of C1 and C2 in FIG. 5.

One way of measuring leakage current is to use a sensor in the form of a coupling capacitor. In addition, the phase angles and the frequency are also measured, using the same sensor. To compensate for the assumptions used in the calculation of PF and capacitance (C1), algorithms for filtering and smoothing are implemented. The assumptions are that the line voltage at the bushing terminals is constant on all three phases, and that the phase angles between the phase voltages are constant.

FIGS. 6a-c shows how C1 and C2 are defined, as well as offline measurement methods, typically done with 10 kV. FIGS. 6a-c shows measurements of (a) main insulation (C1), (b) tap insulation (C2) and (c) insulation of bushings (C1) when tap is not included, respectively.

In terms of other factors that may affect the deterioration of the bushing's insulation abilities, these include the following:

1. Exposure of the insulation to a range of frequencies results in permittivity and loss index, as a result of dielectric polarizations which exist in the material. The two most important are dipole polarization due to polar molecules and interfacial polarization caused by inhomogeneities in the material. It is expected that bushing insulation in a substation may be exposed to the entire electromagnetic spectrum, from direct current frequencies (0 Hz) to radar frequencies of at least $3 \times 10^{10}$ Hz. There are only very few materials, such as polystyrene, polyethylene, and fused silica, whose permittivity and loss index are even approximately constant over this frequency range.
2. The major electrical effect of temperature on an insulating material is to increase the relaxation frequencies of its polarizations. They increase exponentially with temperature at rates such that a tenfold increase in relaxation frequency may be produced by temperature increments ranging from 6 to 50° C. The temperature coefficient of permittivity at the lower frequencies would always be positive except for the fact that the temperature coefficients of permittivity resulting from many atomic and electronic polarizations are negative. The temperature coefficient will then be negative at high frequencies, become zero at some intermediate frequency and positive as the relaxation frequency of the dipole or interfacial polarization is approached.
3. Voltage stress causes dielectric polarizations, except interfacial polarization, which are nearly independent of the existing potential gradient until such a value is reached that ionization occurs in voids in the material or on its surface, or that breakdown occurs. In interfacial polarization the number of free ions may increase with voltage and change both the magnitude of the polarization and its relaxation frequency. The dc conductance is similarly affected.
4. Humidity has the electrical effect on an insulating material of increasing greatly the magnitude of its interfacial polarization, thus increasing both its permittivity and loss index and also its dc conductance. The effects of humidity are caused by absorption of water into the volume of the material and by the formation of an ionized water film on its surface. The latter forms in a matter of minutes, while the former may require days and sometimes months to attain equilibrium, particularly for thick and relatively impervious materials.
5. Water immersion is the effect of water immersion on an insulating material approximates that of exposure to 100% relative humidity. Water is absorbed into the volume of the material, usually at a greater rate than occurs under a relative humidity of 100%. However, the total amount of water absorbed when equilibrium is finally established is essentially the same under the two conditions. If there are water-soluble substances in the material, they will leach out much faster under water immersion than under 100% relative humidity without condensation. If the water used for immersion is not pure, its impurities may be carried into the material. When the material is removed from the water for measurement, the water film formed on its surface will be thicker and more conducting than that produced by a 100% relative humidity without condensation, and will require some time to attain equilibrium.
6. Ageing means that under operating conditions of voltage, temperature and mechanical shocks, an insulating material may deteriorate in electric strength because of the absorption of moisture, physical changes of its surface, chemical changes in its composition, and the effects of ionization both on its surface and on the surfaces of internal voids. In general, both its permittivity and its dissipation factor will be increased, and these increases will be greater the lower the measuring frequency.
7. Weathering, is a natural phenomenon, which includes the effects of varying temperature and humidity, of falling rain, severe winds, impurities in the atmosphere, and the ultraviolet light and heat of the sun. Under such conditions the surface of an insulating material may be permanently changed, physically by roughening and cracking, and chemically by the loss of the more soluble components and by the reactions of the salts, acids, and other impurities deposited on the surface.

The present invention thus also aims to provide a transformer bushing that, when viewed holistically, is the best possible bushing when taking into account all the factors mentioned above.

SUMMARY OF THE INVENTION

In accordance with the invention there is provided a bushing for a transformer, the bushing comprising:

an elongate enclosure body to accommodate a conductor extending along a longitudinal axis, the conductor having a first terminal end a second terminal end, the ends extending from opposite sides of the enclosure body;

a mounting flange fitted to the enclosure body to enable the bushing to be mounted to an enclosure of the transformer;

the enclosure body comprising two electrically insulating layers partially surrounding the conductor, a first layer of the insulating layers being substantially provided by a first polymeric material and a second layer of the insulating layers being substantially provided by a second polymeric material, the layers being arranged about the conductor in such a manner that the bushing is substantially cavity-free.

In an embodiment, the first layer defines an inner core, with the second layer providing an outer cover which at least partially covers the inner core.

In an embodiment, the inner core includes a condenser screen arrangement, in the form of fine layers of metallic screens included or inserted in the inner core.

The two electrically insulating layers may be attached directly to the conductor, thereby providing a substantially cavity-free bushing. In some embodiments, the first layer may be moulded directly onto the conductor. The second layer may be moulded directly onto the first layer.

The first layer may be substantially provided by resin and the second layer may be substantially provided by a hydrophobic material. The hydrophobic material may be a polymer. The polymer may be an elastic polymer. In one embodiment, the first layer is substantially provided by resin and the second layer is substantially provided by silicone rubber. The second layer may thus be provided by a substantially shock resistant material.

The coefficient of thermal expansion of the conductor and the first layer may be selected so as to be closely aligned, thereby reduce the possibility or extent of delamination due to mechanical stress caused by a temperature gradient between the conductor and the first layer, in use.

The second layer may provide a plurality of coaxial sheds spaced apart along the length of the bushing.

In some embodiments, the conductor may be provided by a tube. In other embodiments, the conductor may be a solid, rod-like conductor.

The first terminal end of the conductor may be configured for operative connection to an electrically active component of the transformer and the second terminal end of the conductor may be configured for operative connection to an electrically active external component. The electrically active component of the transformer may be transformer windings and the electrically active external component may be a supply line.

The conductor may be manufactured from any suitable conductive material, e.g. aluminium or copper.

The bushing is preferably a high voltage bushing, for use in phase-to-phase voltages greater than 100 kV and in current ratings ranging from approximately 1250 A to 2700 A. In one embodiment, the bushing is a 132 kV bushing. The bushing may be configured for use as a generation, transmission or distribution transformer.

In some embodiments, the bushing may include a condition monitoring sensor. The condition monitoring sensor may be configured to monitor one or more predefined condition parameters associated with the bushing and to communicate values of one or more monitored parameters to a receiving module remote from the bushing.

In an embodiment, the measured condition parameter is leakage current in both of the two electrically insulating layers, with the sensor taking the form of a coupling capacitor.

In an embodiment, the sensor includes a transmitter to transmit the measured condition parameter to a remote controller, typically in an online manner.

The invention extends to a transformer which includes at least one bushing as hereinbefore described.

BRIEF DESCRIPTION OF DRAWINGS

The invention will now be further described, by way of example, with reference to the accompanying diagrammatic drawings.

In the drawings.

DETAILED DESCRIPTION OF AN EMBODIMENT

The following description of the invention is provided as an enabling teaching of the invention. Those skilled in the relevant art will recognise that many changes can be made to the embodiment described, while still attaining the beneficial results of the present invention. It will also be apparent that some of the desired benefits of the present invention can be attained by selecting some of the features of the present invention without utilising other features. Accordingly, those skilled in the art will recognise that modifications and adaptations to the present invention are possible and can even be desirable in certain circumstances, and are a part of the present invention. Thus, the following description is provided as illustrative of the principles of the present invention and not a limitation thereof.

Figure 1:
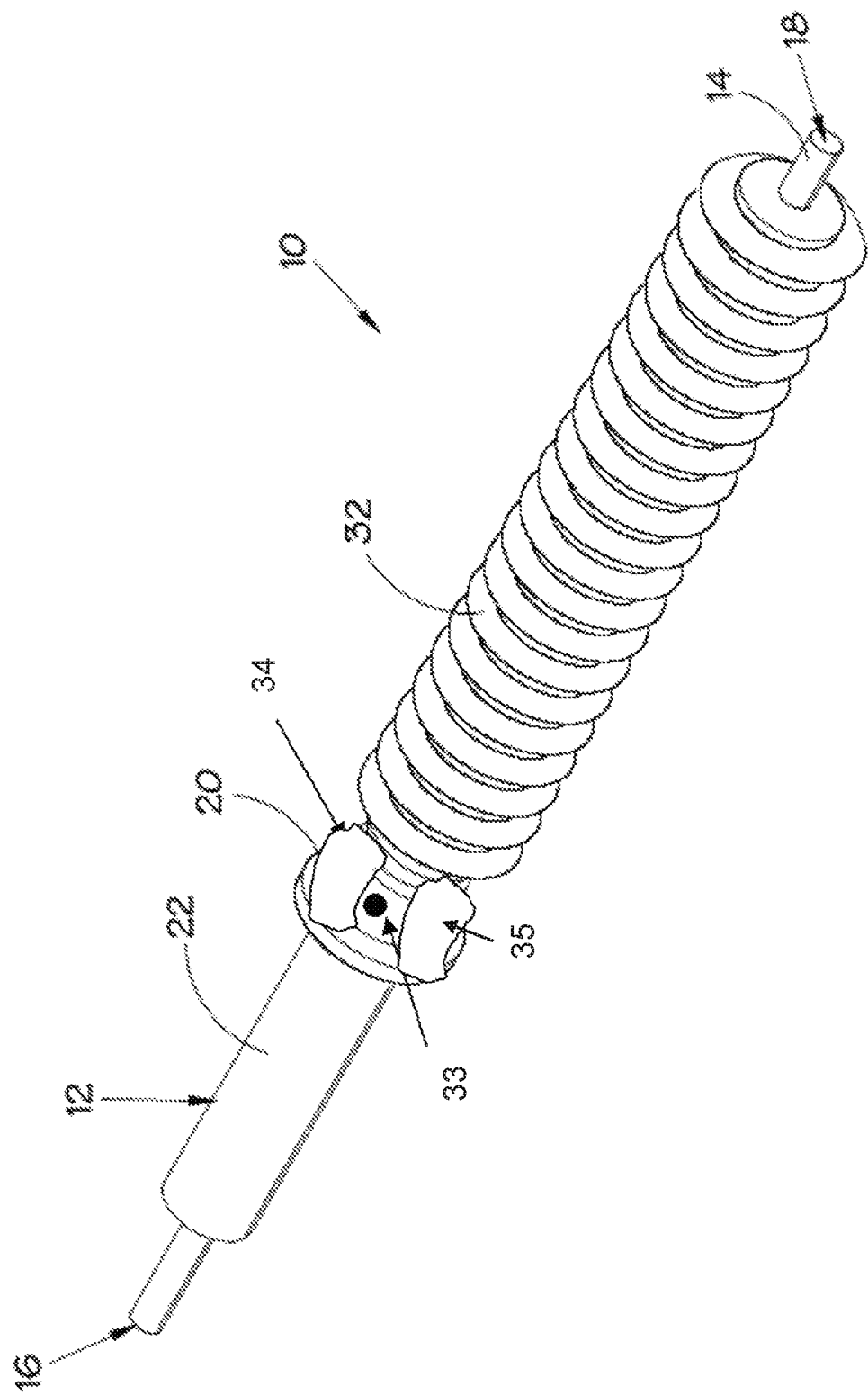
FIG. 1 shows a perspective view of a bushing for a transformer.
Figure 2:
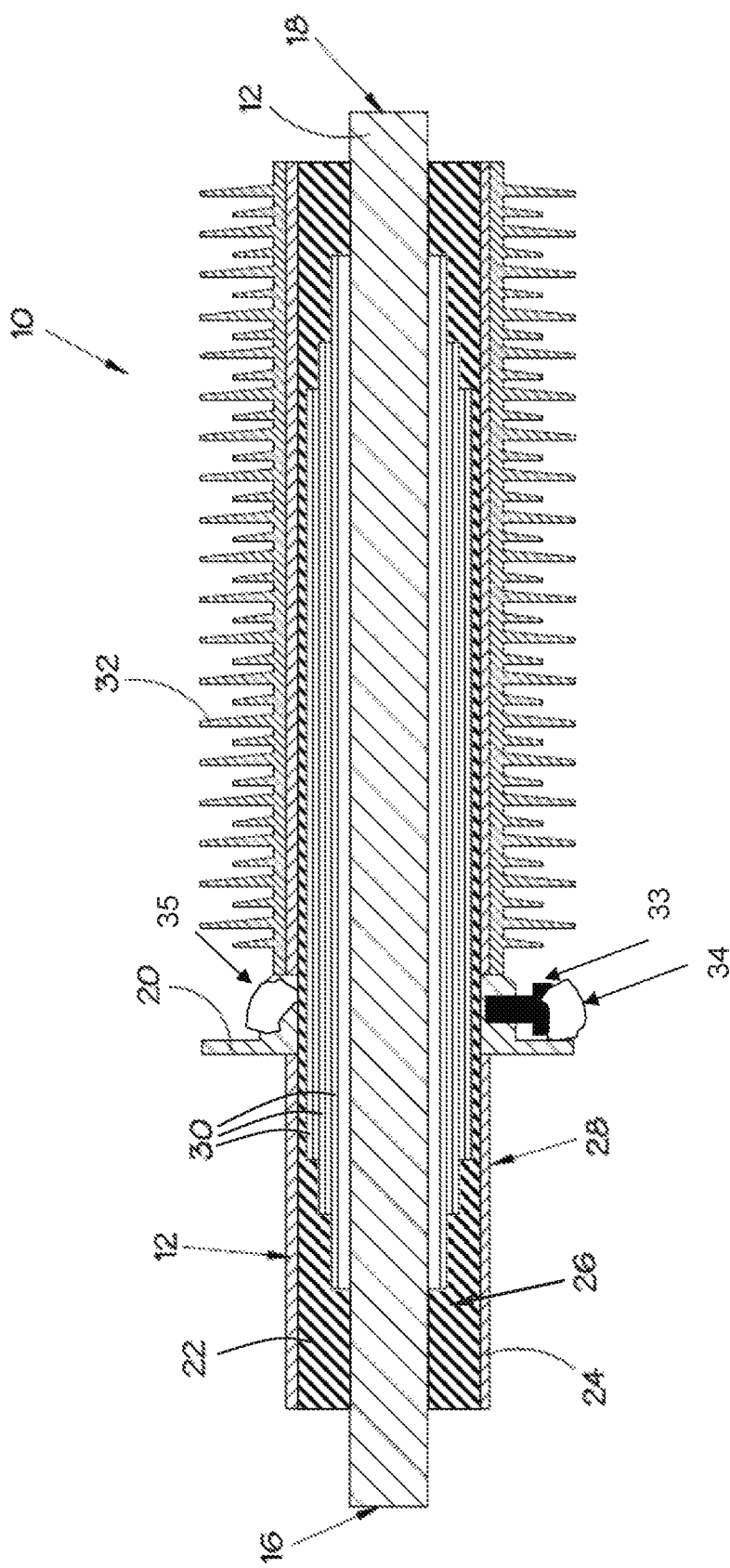
FIG. 2 shows a cross-sectional side view of the bushing shown in FIG. 1.
Figure 4:
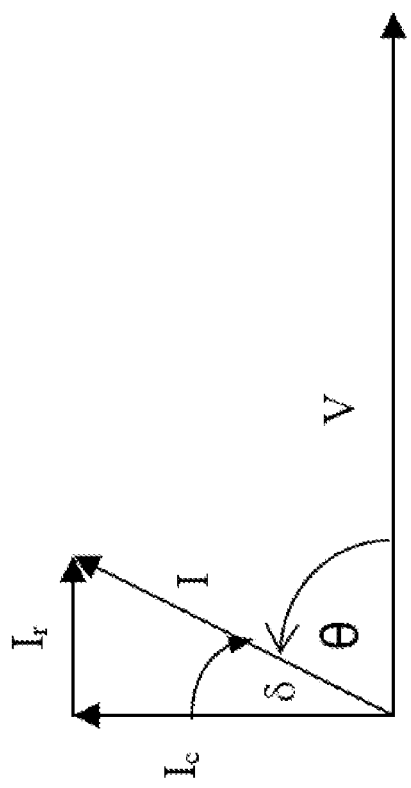
FIG. 4 shows a phasor diagram that is related to the equivalent circuit diagram shown in FIG. 3.
Figure 3:
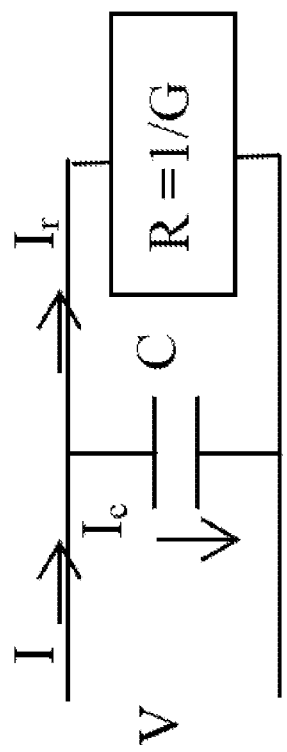
FIG. 3 shows an equivalent circuit diagram for a bushing for a transformer.

Referring to FIGS. 1 and 2, a bushing 10 for a transformer is shown, the bushing 10 comprising an elongate enclosure body 12 to accommodate a conductor 14 extending along a longitudinal axis. The conductor 14 has a first terminal end 16 a second terminal end 18, the ends 16, 18 extending from opposite sides of the enclosure body 12. In some embodiments, the conductor 14 comprises a tube; preferably, however, the conductor 14 comprises a solid, rod-like conductor. The conductor 14 may be manufactured from any suitable conductive material, e.g. aluminium or copper.

A mounting flange 20 is fitted to the enclosure body 12 to enable the bushing 10 to be mounted to an enclosure of the transformer.

The enclosure body 12 comprises two electrically insulating layers 22, 24 partially surrounding the conductor 14.

The first layer 22 of the insulating layers is substantially provided by a first polymeric material and the second layer 24 of the insulating layers being substantially provided by a second polymeric material. The layers 22, 24 are arranged about the conductor 14 in such a manner that the bushing is substantially cavity-free (and substantially devoid of oil and paper).

The first layer 22 typically defines an inner core 26, with the second layer 24 providing an outer cover 28 which at least partially covers the inner core 26. The two electrically insulating layers 22, 24 may be attached directly to the conductor 14, thereby providing a substantially cavity-free bushing. In some embodiments, the first layer 22 may be moulded directly onto the conductor 14, with the second layer 24 being moulded directly onto the first layer 22.

The first layer 22 may be substantially provided by resin and the second layer 24 may be substantially provided by a hydrophobic material. The hydrophobic material may be a polymer. The polymer may be an elastic polymer. In one embodiment, the first layer 22 is substantially provided by resin and the second layer 24 is substantially provided by silicone rubber. The second layer 24 may thus be provided by a substantially shock resistant material.

The coefficient of thermal expansion of the conductor 14 and the first layer 22 may be selected so as to be closely aligned, thereby to reduce the possibility or extent of delamination due to mechanical stress caused by a temperature gradient between the conductor 14 and the first layer 22, in use. The society for materials engineers and scientists (ASM) lists typical values of linear and volumetric expansion ($10^{-6}$ m/m·K$^{-1}$) for various materials at 20° C. and 101.325 kPa as follows: Water 69 and 207; Aluminium 23.1 and 69; Copper 17 and 51; PVC 52 and 156; Polypropylene 150 and 450.

Figure 5:
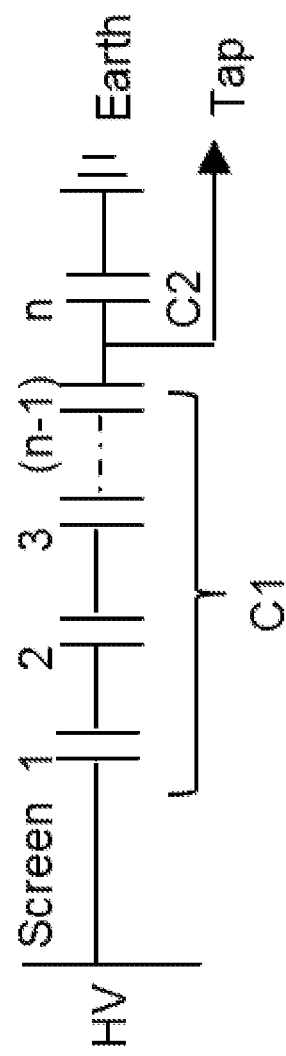
FIG. 5 is a schematic diagram showing how to determine a bushing's dielectric loss factor and capacitance by summing leakage current for bushings at one side of a transfer.
Figure 6A:
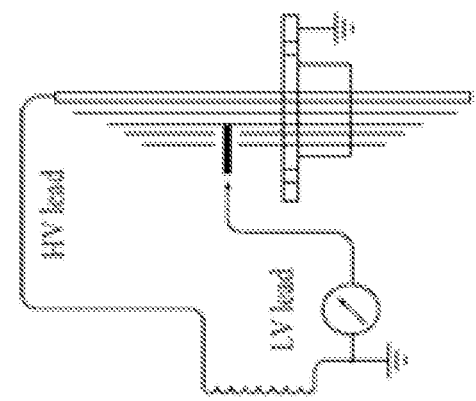
FIGS. 6*a*-*c* show measurements of (a) main insulation (C1), tap insulation (C2) and (c) insulation of bushings (C1) when a tap is not included.
Figure 6B:
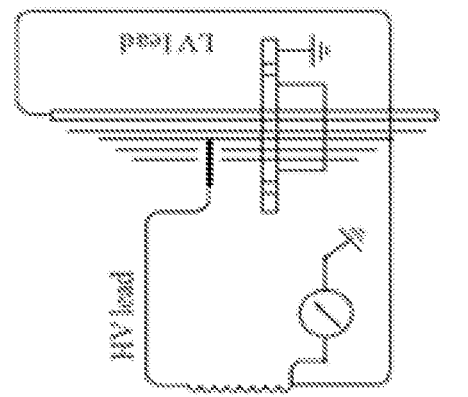
Figure 6C:
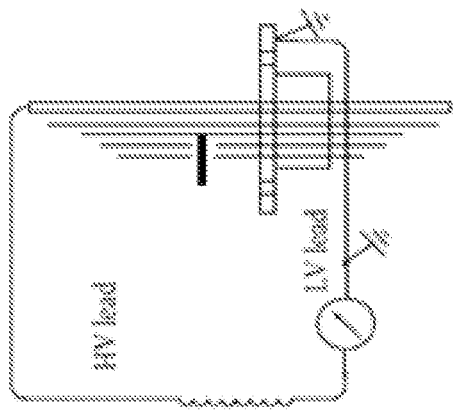

In an embodiment, the inner core 26 includes a condenser screen arrangement, typically in the form of very fine layers of metallic foil screens 30 included or inserted in the inner core 26. A condenser screen arrangement is generally only required at voltages above 88 kV, and although three screens 30 are shown in FIG. 2, the exact number, arrangement and layout of the screen 30 may vary depending on the application. The screens 30 produce a capacitive effect which dissipates the electrical energy more evenly throughout the inner core 26 and reduces the electric field stress between the energized conductor 14 and any earthed material. It does this by distributing the electric field optimally in the radial and tangential directions, so as to lengthen the lifespan of the insulation materials. If the capacitances due to the screens 30 are equal, then the voltage is distributed as shown in FIG. 5. A lower and uniformly distributed voltage within the dielectric materials reduces the electric stress in the bushing 10. The inner core 26 may be assembled so as to minimize electric stress in the bushing 10 and/or on a surface of the bushing 10.

The outer cover 28 of the second layer 24 may include a plurality of coaxial sheds 32 spaced apart along the length of the bushing.

The first terminal end 16 of the conductor 14 may be configured for operative connection to an electrically active component of the transformer and the second terminal end 18 of the conductor 14 may be configured for operative connection to an electrically active external component. The electrically active component of the transformer may be transformer windings and the electrically active external component may be a supply line.

The bushing 10 is preferably a high voltage bushing 10, for use in phase-to-phase voltages greater than 100 kV and in current ratings ranging from approximately 1250 A to 2700 A. In one embodiment, the bushing 10 is a 132 kV bushing. The bushing 10 may be configured for use as a generation, transmission or distribution transformer.

In some embodiments, the bushing 10 may include a condition monitoring sensor 34, 35. The condition monitoring sensor 34, 35 may be configured to monitor one or more predefined condition parameters associated with the bushing 10 and to communicate values of one or more monitored parameters to a receiving module remote from the bushing 10. In an embodiment, the measured condition parameter is leakage current in both of the two electrically insulating layers, with the sensor 34, 35 taking the form of a coupling capacitor with detection ranging from 80 pF up to 10 µF. The sensor 34, 35 is typically placed at the flange 20 by means of a circumferential strapped band attachment or a threaded bolt-in device into a connection point 33 that is similar to a test tap that is present on most high voltage bushings.

In an embodiment, the sensor 34, 35 includes a transmitter to transmit the measured condition parameter to a remote controller, typically in an online manner. Communications of measured data is network neutral or network independent. The sensor 34, 35 can thus use any available network such as a powerline carrier, a fibre telecommunications network or a wireless network. On-line monitoring and alarming systems allow for the uploading measured data to a server for remote analysis. This feature saves customers the costs associated with bringing in an expert and paying its staff to accompany someone at the local site to perform advanced diagnostics.

The bushing described herein provides increased safety and a significantly lower risk to consumers. Particular advantages of the bushing of the invention including the following non-exhaustive list:

1. The bushing is waterproof and paperless.
2. The design may eliminate or reduce the risk of bushing explosions and reduce the probability of burn out fires on power transformers.
3. The bushing is sustainable and environmentally friendly as it does not utilize or depend on fossil fuels, e.g. oil, which is a depleting natural resource and which fluctuates in cost.
4. The bushing is environmentally friendly and meets the requirements of international specifications, which require transformer bushings to "be of technology that provides safe operation of the transformer, maintenance free or require minimum maintenance, environmentally friendly, and as far practically possible does not add fire risk".
5. In some embodiments, the bushing can be monitored and maintained from a remote location.
6. The remote access component optimizes maintenance of the bushing and reduces risk to employees who are hired to service bushings, as physically attending to a bushing would not be required frequently.
7. The design ensures the least possible level of partial discharges and also provides mechanical strength.
8. The design can be customised and is suitable for a wide range of transformer application.
9. Polymeric dry bushings can withstand extreme operating conditions, including temperatures ranging from −40° to 60° C., which significantly reduces maintenance and storage costs.
10. The design can be used in many different applications, e.g. generation, transmission and distribution transformers that require increased levels of reliability and safety.

11. The bushing uses shock resistant resin that is housed in elastic polymer in order to provide cushion against shock.
12. The use of a polymer as a main component significantly prolongs the life of the bushing and reduces the probability of combustion over the lifespan of the product.
13. Unlike fibreglass composition bushings which delaminate under high electric stress, water ingress and pollution, the proposed dual polymer bushing is highly reliable.
14. Oil impregnated porcelain designed bushings are susceptible to explosion and fires which can result in injury or fatalities of personnel, which the dual polymer bushing of the invention addresses.
15. Most resin bushings suffer from brittle fractures as they are not shock resistant, so under seismic loading such bushings fail, whereas vibration simulations based on data sheet specifications of the resin type used in this invention of the 132 kV polymeric bushing eliminates this risk.
16. This gives the invention an overall operating advantage in performance, as opposed to oil insulated paper, resign impregnated paper or oil cooled resign impregnated paper which has a higher probability of combustion over time.
17. The elimination of fibreglass and porcelain increases reliability and reduces or eliminates the risk of fractures, explosions causing fires, as well as delamination.
18. The bushing can withstand a relatively high thermal load.

The invention claimed is:

1. A bushing for a transformer, the bushing comprising:
an elongate enclosure body to accommodate a conductor extending along a longitudinal axis, the conductor having a first terminal end and a second terminal end, the ends extending from opposite sides of the enclosure body;
a mounting flange fitted to the enclosure body to enable the bushing to be mounted to an enclosure of the transformer;
the enclosure body comprising a first electrically insulating layer surrounding the conductor and a second electrically insulating layer surrounding a substantial portion of the conductor in the bushing, the first electrically insulating layer being substantially provided by a first polymeric material and the second electrically insulating layer being substantially provided by a second polymeric material, the electrically insulating layers being arranged about the conductor in such a manner that the bushing is substantially cavity-free and the first electrically insulating layer being substantially covered by the second electrical insulating layer and a portion of the first electrically insulating layer being surrounded by the mounting flange; and
a condenser screen arrangement disposed within the first electrically insulating layer, the condenser screen arrangement comprising a plurality of fine layers of longitudinally continuous metallic screens arranged so that a longitudinal midpoint of each fine layer of longitudinally continuous metallic screen is substantially aligned along a transverse axis perpendicular to each fine layer of longitudinally continuous metallic screen, the transverse axis being spaced apart from the mounting flange, wherein each fine layer of longitudinally continuous metallic screen is ungrounded.

2. The bushing of claim 1, wherein the two electrically insulating layers are attached directly to the conductor, thereby providing a substantially cavity-free bushing.

3. The bushing of claim 2, wherein the first electrically insulating layer is moulded directly onto the conductor and the second electrically insulating layer is moulded directly onto the first layer.

4. The bushing of claim 1, wherein the first electrically insulating layer is substantially provided by epoxy and the second electrically insulating layer is substantially provided by a hydrophobic material.

5. The bushing of claim 4, wherein the hydrophobic material is an elastic polymer.

6. The bushing of claim 4, wherein the first electrically insulating layer is substantially provided by epoxy resin and the second electrically insulating layer is substantially provided by silicone rubber.

7. The bushing of claim 1, wherein the coefficient of thermal expansion of the conductor and the first electrically insulating layer is selected so as to be closely aligned to thereby reduce the possibility or extent of delamination due to mechanical stress caused by a temperature gradient between the conductor and the first electrically insulating layer, in use.

8. The bushing of claim 1, wherein the second electrically insulating layer includes a plurality of coaxial sheds spaced apart along the length of the bushing.

9. The bushing of claim 1, wherein the conductor comprises a tube.

10. The bushing of claim 1, wherein the conductor comprises a solid, rod-like conductor.

11. The bushing of claim 1, wherein the first terminal end of the conductor is connectable to an electrically active component of the transformer and the second terminal end of the conductor is connectable to an electrically active external component.

12. The bushing of claim 1, wherein the bushing is a high voltage bushing, for use in phase-to-phase voltages greater than 100 kV and in current ratings ranging from approximately 1250 A to 2700 A.

13. The bushing of claim 1, wherein the bushing includes a condition monitoring sensor, the condition monitoring sensor being arranged to monitor one or more predefined condition parameters associated with the bushing and to communicate values of one or more monitored parameters to a receiving module remote from the bushing.

14. The bushing of claim 13, wherein the measured condition parameter is leakage current in both of the two electrically insulating layers, with the sensor taking the form of a coupling capacitor.

15. The bushing of claim 13, wherein the sensor includes a transmitter to transmit the measured condition parameter to a remote controller, in an online manner.

* * * * *